United States Patent Office 3,206,933
Patented Sept. 21, 1965

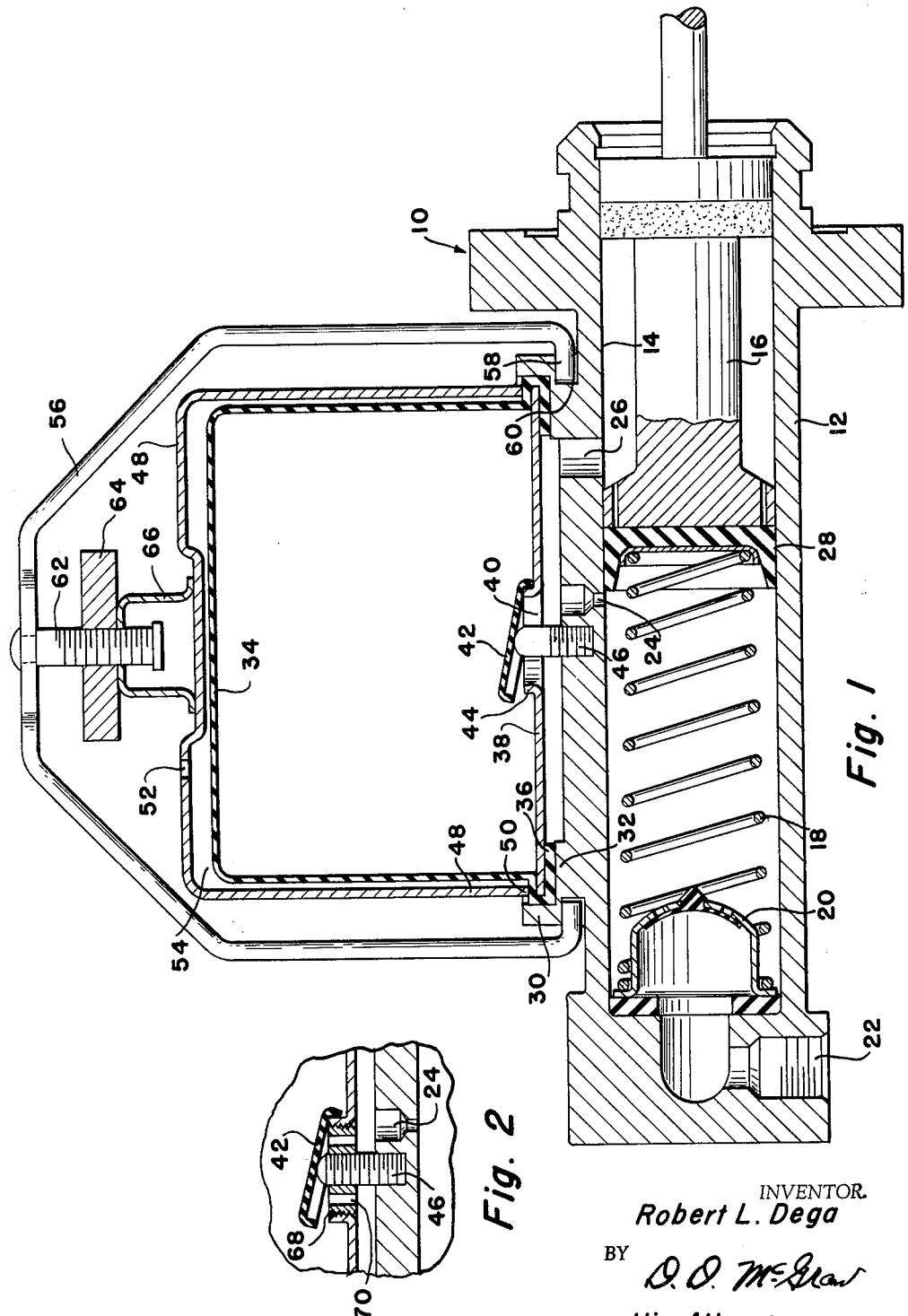

1

3,206,933
SEALED HYDRAULIC FLUID SYSTEM
Robert L. Dega, Utica, Mich., assignor to General Motors Corporation, Detroit, Mich., a corporation of Delaware
Filed Oct. 9, 1964, Ser. No. 402,908
5 Claims. (Cl. 60—54.6)

The invention relates to a hydraulic fluid utilizing system in which the fluid supply is sealed from the atmosphere, and more particularly to one in which the fluid supply reservoir is easily replaceable for replenishment of fluid. It is especially applicable to vehicle hydraulic brake systems. Since most of the hydraulic brake fluids utilized in automotive vehicles have a high percentage of alcohol which is in itself hydroscopic, brake failures sometimes occur due to moisture entrance into the system which causes corrosion of the various brake components. This is especially true of the sealed surfaces of the master cylinder and their individual wheel cylinders, where the sealing cups are in sliding contact with the metal. The problem may be aggravated in some instances wherein the composition of the sealing cup is an elastomer material which, when contacting metal in the presence of moisture, will cause corrosion. Brake fluids are processed to have a relatively low percentage of water, on the order of 1%–2%, but additional moisture finds its way into the brake system due to the necessity of venting the master cylinder supply chamber. Furthermore, the supplies of makeup fluid at service stations are usually not properly sealed and stored and can be the source of additional water contamination. It is, therefore, advantageous to provide a sealed system for the supply of fluid which will eliminate or appreciably reduce the deleterious effects due to moisture absorption by the brake fluid. At the same time it is desirable to continue the use of atmospheric pressure for the supply of fluid to the master cylinder from the reservoir and to permit compensation for differential expansion of the fluid due to temperature.

In structure embodying the invention a rubber-like bag or container is provided which contains replenishment fluid and acts as a primary fluid reservoir. The bag is constructed with an open end which is sealed to a plate serving as a support for the container. The plate may contain a boss or fitting threaded for facilitating attachment to the master cylinder. The plate may also contain a valve or cap arrangement which keeps the container sealed until it is installed on the master cylinder, with the action of installation causing the opening of the container after the container is initially sealed to the master cylinder. The bag is preferably mounted in a container cover which protects it from exterior damage and also will act as an emergency reservoir should the bag be damaged so as to leak fluid through the wall thereof. This provides a self-contained disposable unit which is factory filled with brake fluid having a minimum moisture content. Since the fluid does not become exposed to the open air at any time, the absorption of additional moisture by it is minimized. The vented cover may be utilized as part of the mounting system for the bag in conjunction with a bail and retaining screw arrangement. The bag preferably has a sealing flange formed adjacent the plate which engages a mounting flange surrounding the master cylinder compensation ports so that when the valve is opened upon installation fluid in the bag can flow directly to the ports. As fluid is utilized from the bag, atmospheric pressure on it will cause the bag to collapse, thus eliminating the requirement for the entrance of atmospheric air into the same container in which the fluid supply is held.

In the drawing:

FIGURE 1 is a cross section view of a master cylinder portion of a hydraulic fluid system utilizing structure embodying the invention.

2

FIGURE 2 is a fragmentary cross section view similar to a portion of FIGURE 1 and showing a modification of the structure of FIGURE 1.

The portion of the hydraulic system illustrated in FIGURE 1 includes a master cylinder assembly 10 of generally conventional construction. The assembly has a body 12 in which a bore 14 is formed. A pressurizing piston 16 operates in bore 14 to pressurize fluid in chamber 18. Pressurized fluid passes through the residual pressure valve 20 and out passage 22 to the various wheel cylinders to operate the brakes. Compensation ports 24 and 26 are provided in the usual manner. The sealing cup 28 associated with piston 16 moves to close port 24 at the beginning of the pressurizing movement of the piston, and opens that port when the piston returns to the released position.

A mounting flange 30 is formed as a part of body 12 and includes a shoulder 32. Flange 30 and shoulder 32 surround an area in which ports 24 and 26 are provided. that area being comparable to the bottom of the usual master cylinder fluid reservoir. The collapsible rubber-like bag or container 34 is filled with hydraulic fluid. The bag is open at its lower end and a sealing flange 36 is formed as a part of this end of the bag. A plate 38 is installed in the end of the bag in sealing relation with flange 36 so as to close the bag. A center portion of the plate has an aperture 40 therein which is normally closed by the valve or cap 42. Valve 42 is illustrated as being a cap which snaps over flange 44 formed as the wall of aperture 40 so that the cap is removable by pressing on it to push it inwardly into the bag. Other normally closed valve constructions may be utilized as desired. The master cylinder body has a stud 46 secured therein in alignment with aperture 40 and extending upwardly a sufficient distance to engage valve 42 and push the valve to the open position when the plate 38 is forced downwardly so that sealing flange 36 engages mounting flange 30 in sealing relation. The fluid contained in bag 34 can then pass through aperture 40 and to ports 24 and 26.

A cover 48, preferably having an inverted cup-like conformation, fits over bag 34 and has its open end 50 in engagement with sealing flange 36. A vent aperture 52 is provided in the upper end of cover 48 so that atmospheric pressure is in the chamber 54 defined by the cover and the outer surface of bag 34. A bail 56 has its ends 58 hooked in suitable recesses 60 formed under flange 30 and extends over cover 48. The bail is provided with a threaded stud 62 above cover 48. A nut 64 is threaded on stud 62 and engages a retainer 66 through which stud 62 extends. Retainer 66 engages cover 48. When nut 64 is threaded downwardly on the stud 62 it forces cover 48 into tight sealing engagement with flange 36 and also holds the reservoir 34 in place. In the modification shown in FIGURE 1, the tightening action of cover 48 also forces plate 38 downwardly so that valve 42 is opened by stud 46.

In the modification shown in FIGURE 2, an internally threaded member 68 is secured in passage 40 and stud 46 is threaded so that plate 38 may be rotated to thread member 68 downwardly on stud 46 to mount the plate in the bag 34 on the master cylinder body. Member 68 is provided with passages 70 so that when valve or cap 42 is opened by the outer end of stud 46 fluid may flow from the interior of bag 34 to the compensation ports. When this mounting system is utilized it is not necessary to provide the cover 48 and the bail 56 for mounting purposes, although they may be provided if desired.

When cover 48 is installed as shown in FIGURE 1, it acts as an emergency or secondary reservoir since chamber 54 is sealed except for the vent aperture 52 at its upper end. Thus if bag 34 should be ruptured for some reason, the fluid will be contained and not be lost.

The container 34 with its plate 38 and closed valve 42 is prefilled with hydraulic fluid and is stored until use without exposing the hydraulic fluid to moisture in the atmosphere. It is quickly and easily installed and replaced and maintains the fluid utilizing system in a sealed condition during normal operation.

What is claimed is:

1. A master cylinder reservoir comprising a fluid filled rubber-like bag forming a primary reservoir and having a flange seal adapted to fit a sealing and mounting flange on a master cylinder body and a bottom plate formed with an aperture, a cap fastened over and sealing said aperture and removable inwardly of said bag, an inverted cup-like secondary reservoir surrounding said primary reservoir and sealing on said lip seal, and means for holding said reservoirs in sealed position on a master cylinder.

2. Means for replenishing the fluid in a hydraulic system comprising fluid utilizing means, a reservoir having a collapsible container with an end opening formed to provide a seal thereabout, an apertured mounting plate sealing said opening and having a flange surrounding the plate aperture and extending into said container, a cap snap fit on said flange and closing the aperture in said plate and adapted to be pushed open by a projection on said fluid utilizing means, and means for securing said container to said fluid utilizing means with said seal in sealing relation thereto.

3. A hydraulic fluid supply system for fluid utilizing means comprising, a vented rigid cover sealingly secured to said utilizing means, a collapsible fluid reservoir having a seal flange formed thereon, said collapsible fluid reservoir being received in said cover and said seal flange providing a seal between said cover and said fluid utilizing means and said reservoir, and valve means normally closing said reservoir and opened by a portion of said fluid utilizing means when said cover and said reservoir are sealingly secured to said fluid utilizing means.

4. A replaceable fluid reservoir for use with means utilizing fluid therefrom and comprising a rubber-like fluid container separably mountable on the fluid utilizing means and having a rigid plate providing a lower sealed end, sealing means for sealing said lower sealed end to the fluid utilizing means, normally closed valve means in said plate, means for opening said valve means upon mounting said container in sealing relation on said fluid utilizing means to provide fluid communication between said container and the fluid utilizing means, and means for mounting said container on the fluid utilizing means in sealed relation thereto, said mounting means including a rigid container cover in sealing engagement with said sealing means to provide a secondary safety fluid reservoir in the event of damage to said container.

5. A replaceable fluid reservoir for use with means utilizing fluid therefrom and comprising a rubber-like fluid container separably mountable on the fluid utilizing means and having a rigid plate providing a lower sealed end, sealing means for sealing said lower sealed end to the fluid utilizing means, normally closed valve means in said plate, means for opening said valve means upon mounting said container in sealing relation on said fluid utilizing means to provided fluid communication between said container and the fluid utilizing means, and means for mounting said container on the fluid utilizing means in sealed relation thereto, said mounting means including an apertured internally threaded member in alignment with said valve and secured to said plate, said valve opening means being a stud threaded in said member to hold said container in said fluid utilizing means and to open said valve by being threaded into said internally threaded member upon rotation of said plate as a part of the mounting operation.

References Cited by the Examiner

UNITED STATES PATENTS 3,059,671   10/62   Kings _____ 60—54.6 X

JULIUS E. WEST, *Primary Examiner.*

ROBERT R. BUNEVICH, *Examiner.*